Feb. 3, 1942.  F. R. SHULTZ  2,271,832
GAS AND WATER SEPARATOR FOR WELLS AND THE LIKE
Filed May 13, 1940
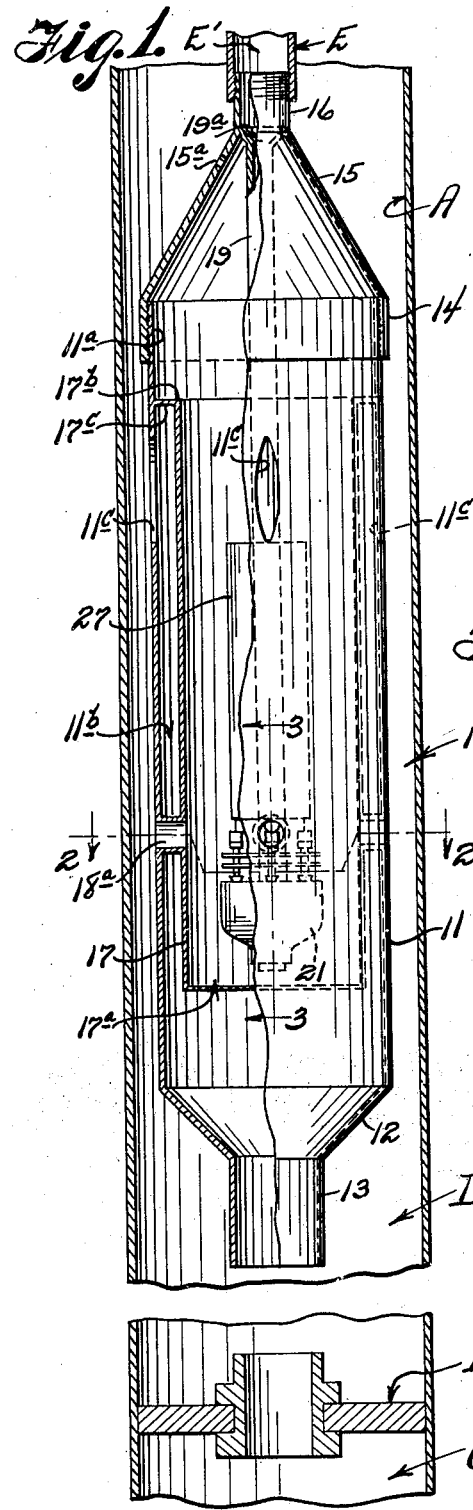
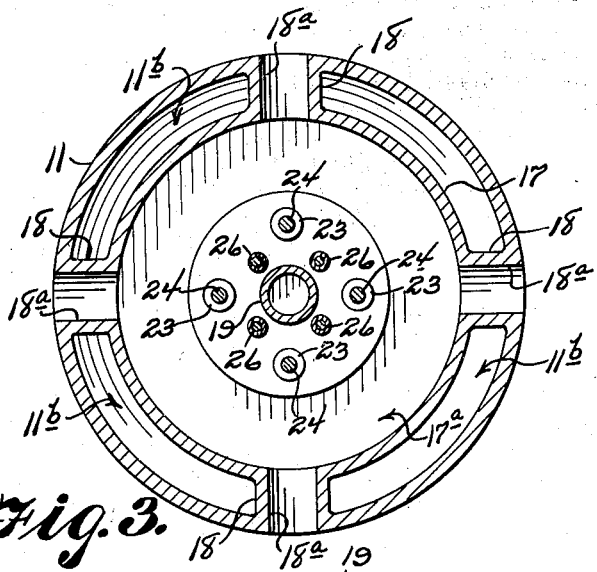
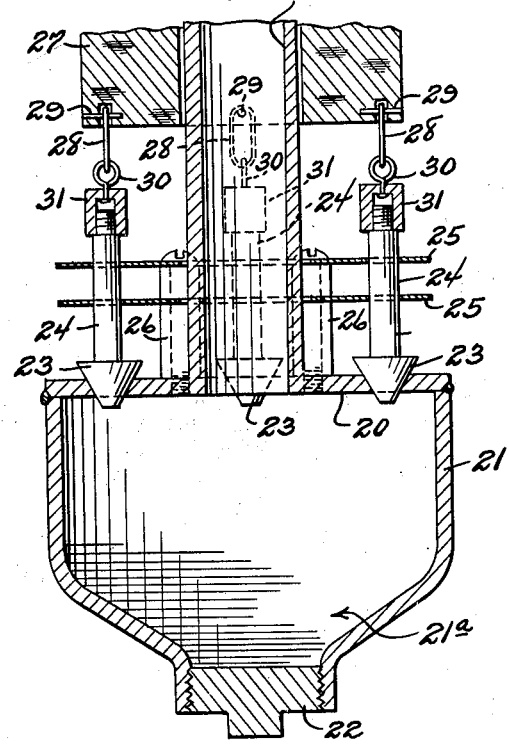
Frank R. Shultz, INVENTOR
BY Victor J. Evans & Co.
ATTORNEYS
WITNESS Patented Feb. 3, 1942

2,271,832

UNITED STATES PATENT OFFICE 2,271,832

GAS AND WATER SEPARATOR FOR WELLS AND THE LIKE

Frank R. Shultz, McFadden, Wyo.

Application May 13, 1940, Serial No. 334,953

4 Claims. (Cl. 166—2)

This invention relates generally to equipment useful in well construction and especially is concerned with a novel device attachable to the delivery line of a well for causing separation of fluids emanating from the delivery line, particularly separating gases from liquids.

It is an object of this invention to provide an efficient, relatively compact separator for use in wells whereby gases can be expeditiously and efficiently segregated from liquid permitting selective delivery from the well.

Another object of this invention is to provide a fluid separator of the type mentioned, the operation of which is controlled by liquid level within the well to a degree such that the falling of the liquid level below a predetermined or at least preselected value causes the closing of the inlet port of the device with concomitant stoppage of discharge from the delivery line.

An advantage of the novel separator device according to this invention over other similar devices now commonly in use is that in use its action is more rapid, that is to say, there is less time lag between the lowering of the fluid level in the well and the closing of the inlet port. This advantage in a measure accrues because of the use of the plurality of simultaneously acting valve members which are controlled by separating means comparatively sensitive to change in fluid level.

Noteworthy among the features of the novel separator according to the present invention are its comparative simplicity and ruggedness of construction, the former well suiting the device to manufacture under conditions of mass production and the latter assuring minimum necessity for and cost of repair.

Other objects, advantages and features of the new and improved gas and water separator according to the present invention will be apparent to those skilled in this art during the course of the following description.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring then to the drawing,

Figure 1 is substantially a vertical sectional view of the presently preferred embodiment of this invention showing same in position of use within a well casing, Fig. 2 is a transverse sectional view of Fig. 1 taken along the plane indicated by the line 2—2, and Fig. 3 is a vertical sectional view of a portion of the structure illustrated in Fig. 1.

In the herein illustrated preferred embodiment of this invention the separator device generally designated by the reference character 10 is shown in Fig. 1 positioned within a well casing A above a so-called packer B which is used to restrict and direct flow of material from the lower portion C of the well casing into the upper portion D thereof.

The separator device comprises an outer casing 11 tubular in shape and terminating at the bottom end in an inverted frusto-conical hollow member 12 communicating with a tubular element 13 open at the bottom substantially as shown. The upper portion 11a of the casing 11 is threaded to receive a tapped sleeve 14 mounted upon a conical shaped hollow member 15 which is rigidly attached at its apex to a threaded connector element 16 engageable with the tapped end portion E of the well delivery line. A second or inner casing 17 mounted coaxially within the first or outer casing 11 is closed at its bottom end 17a and open at the top end 17b and is provided with an outwardly extending flange 17c at its top end by which the second casing is attached to the inner walls of the first casing. Radially extending tubular members 18 providing passages 18a serve further to connect the inner with the outer casing and provide means of communicating from the interior 17a of the second casing 17 to the exterior of the first casing 11. It will be noted that there is no communication between the interior 11b of the casing 11 and the interior 17a of the casing 17. A vent 15a is provided in the top portion of the conical member 15 and by this means liquid within the well D is permitted freely to enter into the interior 17a of the casing 17 and to rise therein to a degree corresponding to its depth in the well. It will also be noted that by reason of the open bottom of the tubular member 13 fluid within the well can enter the interior 11b of the casing 11 and, rising around the exterior of the casing 17, discharge through the semi-elliptical shaped openings 11c formed in upper parts of the outer casing.

The vertically extending pipe 19 coaxially positioned within the first and second casings 11 and 17 respectively and communicating at its top end 19a with the interior E' of the well delivery line E is tapped at its bottom end to be received in and engage with a threaded opening formed in a disc shaped plate 20 to which is attached a downwardly extending chamber 21 having an open bottom normally closed by a threaded plug 22 substantially as shown in Fig. 3. The disc shaped plate 20 is provided with a plurality of downwardly tapering openings therein which serve as valve seats to receive valves 23 carried on vertically sliding rods 24 freely vertically slidingly received in openings formed in spaced essentially parallel guide plates 25 carried on standards 26 mounted upon parts of the plate 20 substantially as shown. A tubular float 27 freely vertically slidingly sleeved upon the pipe 19 is operably associated by connector rings 28 swingably mounted in bottom parts of the float 27 by pins 29 and passing through swivel eyes 30 carried in caps 31 mounted upon top portions of the vertically sliding rods 24. As will be obvious from the drawing, when the float 27 ascends on the pipe 19, the rods 24 are moved upwardly and the valves 23 are unseated, thereby permitting passage of the float through the valve openings into the interior 21a of the chamber 21 and from thence through the pipe 19 to the well delivery line E.

In use it has been found that some solids may settle within the chamber 21 and for that reason the plug 22 closing the bottom of the chamber has been provided for facilitating localization of the undesirable foreign matter.

In use the separator is disposed within the well casing substantially as shown in Fig. 1 whereby water or other liquid within the well passes through the passages 18a onto the interior 17a of the second casing 17, thereby causing the fluid 27 to move upwardly opening the valves leading to the interior 21a of the chamber 21 from which the liquid passes through the pipe 19 to the delivery line E. As will be obvious, when the liquid level within the casing 17 is insufficient to raise the fluid 27, the valves leading to the interior of the chamber 21 will remain closed.

The gas mixed with the liquid which is discharged from the well is separated therefrom by this device in the sense that liquid is discharged through the delivery pipe E and gaseous material is discharged from the well casing after passage through the openings 11c and 15a in addition to the gases which pass around the outer casing between the same and the well casing A. As will be evident to those skilled in this art, proper increase of pressure of gas over liquid in the well can facilitate discharge of fluid through the separator unit and the well delivery line.

It is to be understood that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. A device for use in conjunction with a well delivery line for limiting fluid intake to liquids comprising a vertically extending tubular casing closed at the bottom having openings formed in the sides thereof; an inlet pipe extending axially within said casing communicating at the top with the delivery line; a chamber open at the bottom mounted on the open bottom end of said pipe having a plurality of valve seats formed therein, a removable plug for closing the open bottom of said chamber; standards on said chamber, guides mounted on said standards; sliding valves carried in said guides adapted to close said valve seats; a tubular float freely vertically slidingly sleeved upon said pipe sensitive to fluid level within the casing, and swivel elements connecting said float and said sliding valves whereby upward movement of the former causes unseating the latter.

2. A device useful in conjunction with a well delivery line for limiting fluid intake to liquid comprising a vertically extending tubular casing closed at the bottom having openings formed in the sides thereof; an inlet pipe extending axially within said casing communicating at the top with the delivery line; a chamber open at the bottom end of said pipe having a plurality of valve seats formed therein permitting communication between the interior of said casing and the interior of said pipe; a removable threaded plug for closing the bottom of said chamber; vertical standards on said chamber, horizontally extending guides mounted on said standards; vertically sliding valves mounted in openings formed in said guides engageable with and adapted to close said valve seats; a tubular float freely vertically slidingly sleeved upon said pipe sensitive to changing fluid level within the casing, and means including swivel elements connecting said float and said sliding valves whereby upward movement of the float causes unseating of the valves permitting free communication between the interior of said chamber and the well delivery line.

3. A device useful in conjunction with a well delivery line for limiting intake to liquids, comprising a casing communicating with the liquid within the well, a pipe within said casing communicating at the top with the well delivery line, an enlarged chamber carried by the lower end of the pipe, valve seats in said chamber, a float slidable on the pipe above the chamber, valves loosely suspended by the float and adapted to cooperate with the valve seats in the chamber.

4. A device useful in conjunction with a well delivery line for limiting intake to liquids, comprising a casing communicating with the liquid within the well, a pipe within said casing communicating at the top with the well delivery line, an enlarged closed chamber carried by the lower end of the pipe and having a flat upper end surrounding the pipe, valve seats in said flat upper end of the chamber, a float slidable on the pipe above the chamber, and valves carried by the float and adapted to co-operate with the valve seats in the upper flat end of the chamber.

FRANK R. SHULTZ.